(12) United States Patent
Lim

(10) Patent No.: US 6,396,222 B1
(45) Date of Patent: May 28, 2002

(54) CATHODE RAY TUBE PROTECTION SYSTEM

(75) Inventor: Nam-gyu Lim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/449,614

(22) Filed: Nov. 30, 1999

(30) Foreign Application Priority Data

Dec. 17, 1998 (KR) ............................................. 98-55744

(51) Int. Cl.$^7$ ................................................. H01J 29/96
(52) U.S. Cl. ........................................ 315/411; 348/378
(58) Field of Search .............................. 315/411, 364; 348/378

(56) References Cited

U.S. PATENT DOCUMENTS 4,754,206 A * 6/1988 Sorensen ..................... 315/411

* cited by examiner

Primary Examiner—David Vu
(74) Attorney, Agent, or Firm—Sughrue Mion, PLLC

(57) ABSTRACT

A cathode ray tube protection system for protecting a cathode ray tube from maintenance of high voltage residual occurring when power is turned on or off or due to abnormal operation in a projection-type television is provided. The cathode ray tube protection system includes: a high voltage output unit for providing a high voltage used for driving a cathode ray tube; a high voltage variation detector for detecting a varied high voltage of the high voltage output unit; a cathode ray tube driver for providing a predetermined voltage for driving the cathode ray tube; a medium voltage power supply fuse short-circuit detector for detecting a short-circuit state of a medium voltage fuse based on an operation state of the cathode ray tube driver; and a pulse width modulation processor for generating a pulse width modulation signal for limiting output of the high voltage output unit depending on outputs of the high voltage variation detector and the medium voltage power supply fuse short-circuit detector when the medium voltage fuse short-circuits, regardless of the varied high voltage.

20 Claims, 3 Drawing Sheets

CATHODE RAY TUBE PROTECTION SYSTEM

BACKGROUND OF THE INVENTION

1. Field of the Invention

The present invention relates to a television circuit, and more particularly, to a cathode ray tube (CRT) protection system for protecting a CRT from any residual high voltage remaining after power is turned on/off or from abnormal operation in a projection-type television.

2. Description of the Related Art

A projection-type cathode ray tube (CRT) used in a large screen display projects strong current beams onto a small area. This causes residual high voltage to be maintained when power is turned on/off or when a CRT driver circuit is broken in an abnormal state. If the CRT is broken in a projection display, the broken CRT must be replaced and is costly.

FIG. 1 is a block diagram showing a configuration of a conventional cathode ray tube device. FIG. 1 relates to a high voltage variation control circuit using a variable pulse width modulation (PWM) pulse. When beam variations occur in a CRT 150, a flyback transformer 110 provides a beam variation signal to a PWM processor 120. The PWM processor 120 detects an error value from the beam variation signal and a reference signal, and differentially amplifies the detected error value. Subsequently, the PWM processor 120 compares a horizontally blanked sawtooth wave with the detected error value and provides a pulse waveform according to the detected error value. A high voltage output unit 100 compensates for a reference high voltage pulse with the pulse waveform in accordance with the detected error value to provide an output to the CRT 150. A signal processor 130 processes video and audio signals for display on the CRT 150 and provides the processed video and audio signals to the CRT 150 through a CRT driver 140.

According to conventional technology, when the power supply of a television is operated, it happens that a charged, residual high voltage is maintained in a condenser of the CRT during a state in which deflection is not performed. This causes a spot phenomenon wherein a strong residual beam is focused onto a point of the CRT when the television power is turned off, resulting in a breakdown of the CRT.

Furthermore, in an abnormal state (for example, internal discharge frequently occurring in a beam CRT), driving parts of the CRT driver malfunction and an excessive medium voltage power supply flows to ground. The medium voltage power supply blows out a CRT protection resistor and cuts off the CRT driver circuit. This generates a maximum beam in the CRT adopting a reverse polarity drive mode and drives a screen into a state in which auto brightness limit (ABL) control is not possible. In this situation, if the power supply is cut off, a strong spot occurs, causing the CRT to malfunction.

SUMMARY OF THE INVENTION

It is an object of the present invention to provide a cathode ray tube (CRT) protection system for detecting that a power supply is quickly turned off from a system power supply, to enable the cutting off of a high voltage in order to protect the CRT.

It is another object of the present invention to provide a CRT protection system for detecting a medium voltage power supply occurring when the CRT operates in an abnormal state, to enable the cutting off of a high voltage in order to protect the CRT.

It is still another object of the present invention to provide a CRT protection system for protecting a CRT from maintained, residual high voltage, occurring when power is turned on/off or due to abnormal operation.

To achieve the first object of the present invention, there is provided a CRT protection system, in a projection television, comprising: a high voltage output unit for providing a high voltage used for driving a CRT; a high voltage variation detector for detecting a varied high voltage of the high voltage output unit; a CRT driver for providing a predetermined voltage for driving the CRT; a medium voltage power supply fuse short-circuit detector for detecting a short-circuit state of a medium voltage fuse based on the operation state of the CRT driver; and a pulse width modulation processor for generating a pulse width modulation signal for limiting output of the high voltage output unit depending on outputs of the high voltage variation detector and the medium voltage power supply fuse short-circuit detector when the medium voltage fuse short-circuits, regardless of the varied high voltage.

To achieve the second object of the present invention, there is provided a CRT protection system, in a projection television, comprising: a high voltage output unit for providing a high voltage used for driving a CRT; a high voltage variation detector for detecting a varied high voltage of the high voltage output unit; a falling time power supply detector for detecting a power supply having the shortest falling time from power supplies driving the projection television; a power supply off time detector for providing a voltage signal indicating the on/off state of the power supply detected by the falling time power supply detector; and a pulse width modulation processor adopting a pulse modulation mode controllable for limiting the output of the high voltage output unit based on the outputs of the high voltage variation detector and the power supply off time detector when the detected power supply is in the off state.

To achieve the third object of the present invention, there is provided a CRT protection system, in a projection television, comprising: a high voltage output unit for providing a high voltage used for driving a CRT; a high voltage variation detector for detecting a varied high voltage of the high voltage output unit; a CRT driver for providing a predetermined voltage for driving the CRT; a medium voltage power supply fuse short-circuit detector for detecting a short-circuit state of a medium voltage fuse based on the operation state of the CRT driver; a falling time power supply detector for detecting a power supply having the shortest falling time from power supplies driving the projection television; a power supply off time detector for providing a voltage signal indicating the on/off state of the power supply detected by the falling time power supply detector; and a pulse width modulation processor for receiving the varied high voltage from the high voltage variation detector, the short-circuit state from the medium voltage power supply fuse short-circuit detector, and the power on/off voltage signal from the power supply off time detector and generating a pulse width modulation signal for controlling the output of the high voltage output unit when the medium voltage fuse is in a short-circuited state or when the detected power supply is in the off state, regardless of the varied high voltage.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

Figure 1:
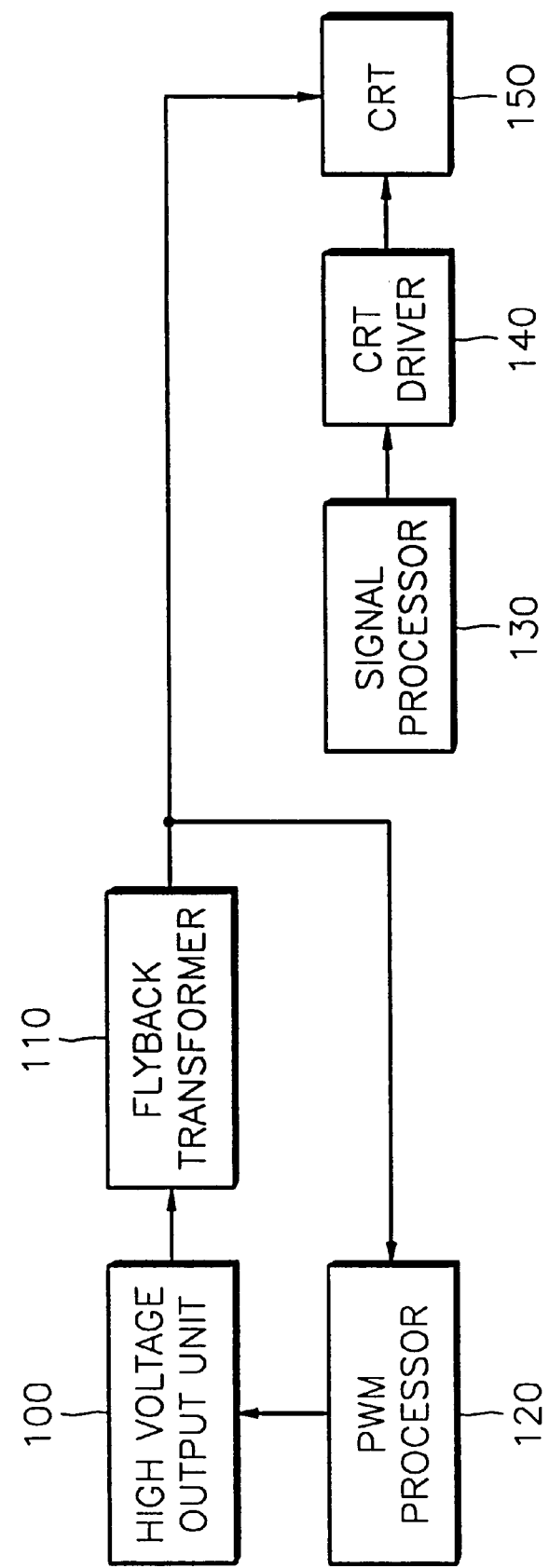
FIG. 1 is a block diagram showing the configuration of a conventional cathode ray tube device.
Figure 2:
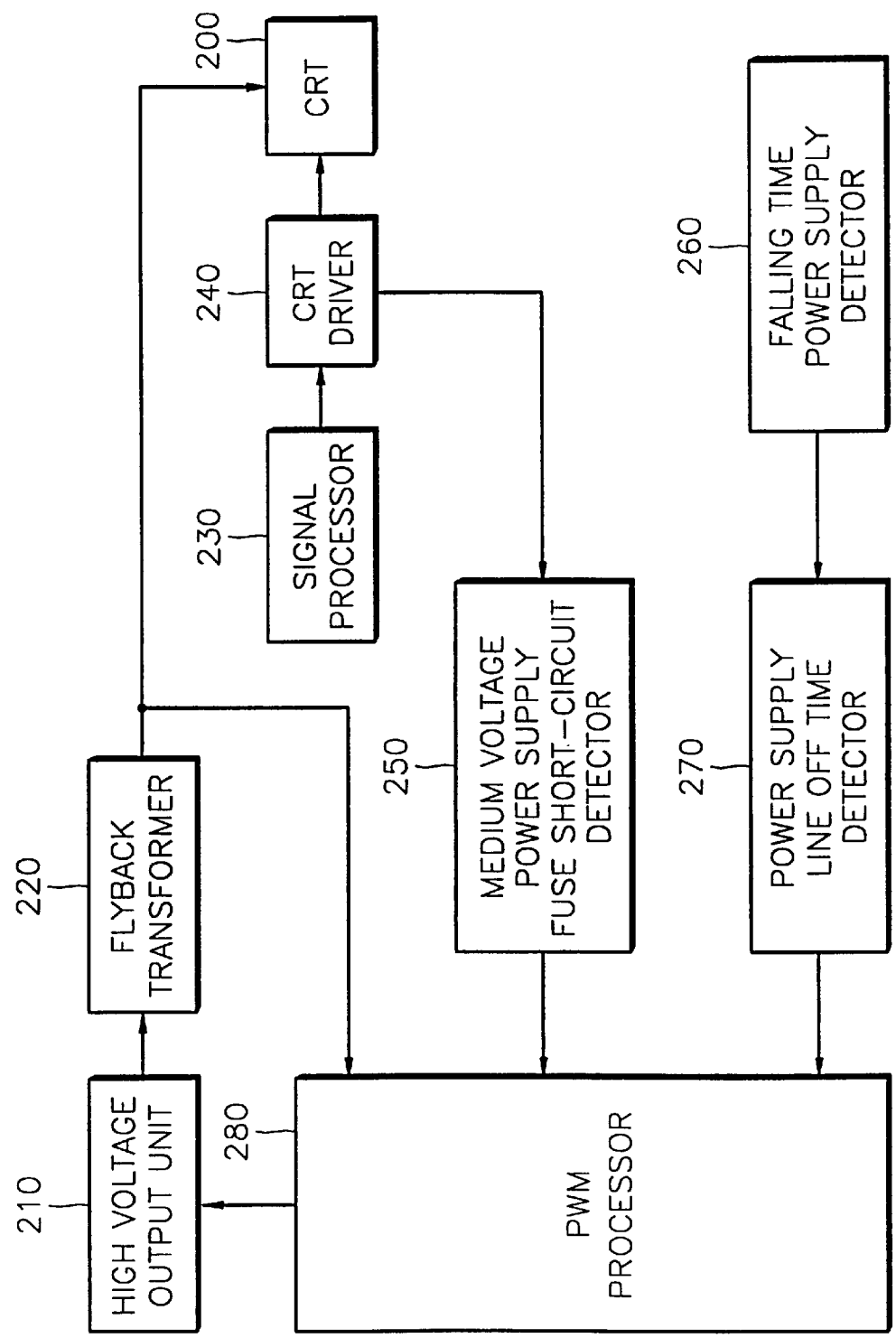
FIG. 2 is a block diagram showing the configuration of a cathode ray tube protection system according to the present invention.

Referring to FIG. 2, a cathode ray tube (CRT) protection system of the present invention comprises: a CRT 200; a high voltage output unit 210 for adjusting the high voltage beam current according to the brightness of an image and an incoming pulse width modulation (PWM) pulse; a flyback transformer (FBT) 220 for supplying the high voltage from the high voltage beam current provided from the high voltage output unit 210 to the CRT 200; a signal processor 230 for processing video and audio signals to be displayed in the CRT 200; a CRT driver 240 for providing an actuating signal to the CRT 200; a medium voltage power supply fuse short-circuit detector 250 for detecting the existence or non-existence of a short-circuit in a fuse according to a medium voltage power supply provided from the CRT driver 240; a falling time power supply detector 260 for detecting a power supply having the shortest falling time from system power supplies when power is turned off; a power supply line off time detector 270 for detecting an "on" or "off" state of a line of the power supply detected by the falling time power supply detector 260; and a PWM processor 280 for generating a PWM pulse for protecting the CRT 200 based on the outputs from the FBT 220, the medium voltage power supply fuse short-circuit detector 250 and the power supply line off time detector 270.

Figure 3:
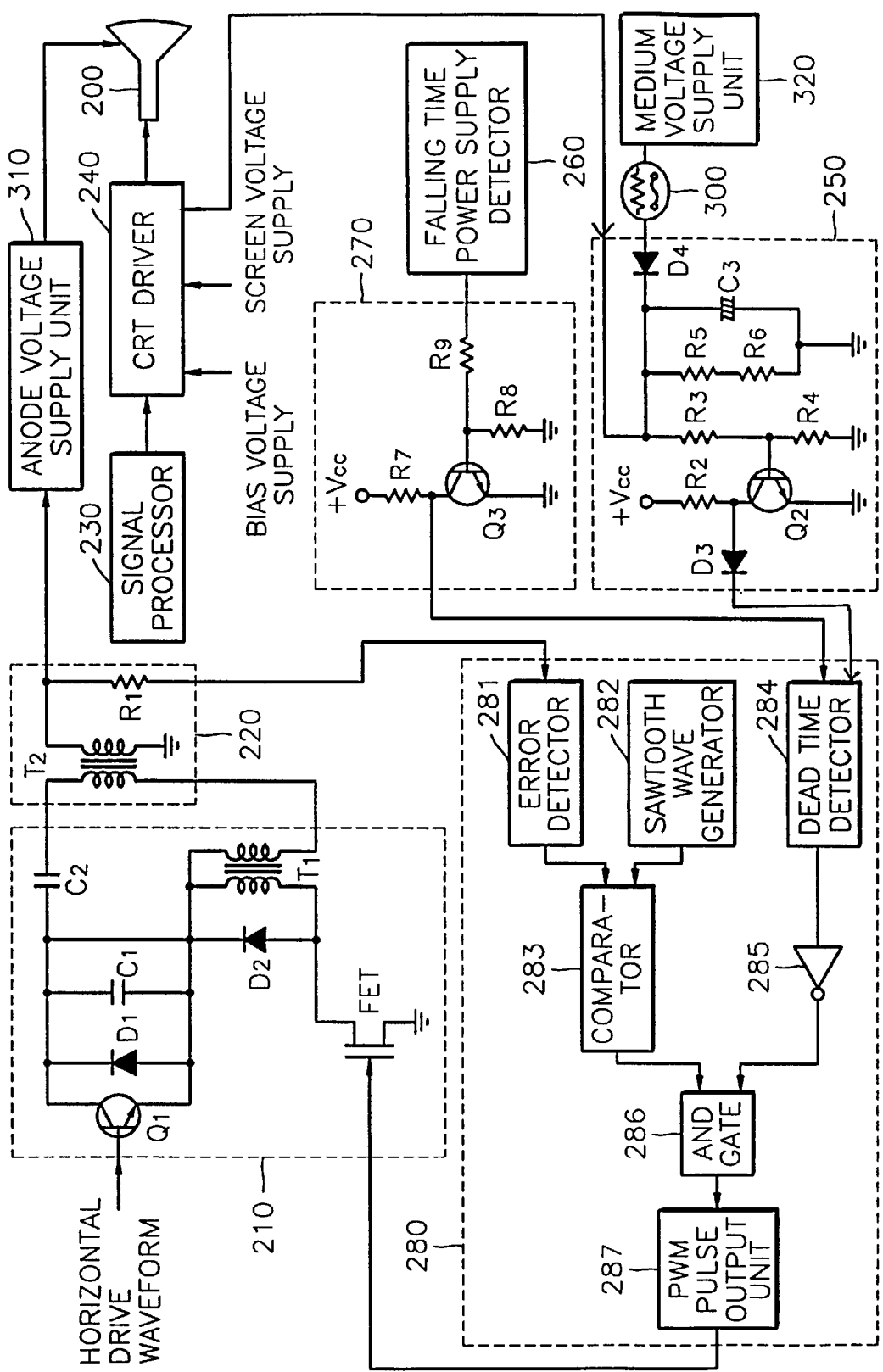
FIG. 3 is a detailed block diagram of FIG. 2.

FIG. 3 is a detailed block diagram of FIG. 2. The high voltage output unit 210 comprises a transistor Q1, diodes D1 and D2, capacitors C1 and C2, a field effect transistor (FET) and a storage transformer T1. The FBT 220 comprises a flyback transformer T2 and a high voltage variation detecting resistor R1.

The medium voltage power supply fuse short-circuit detector 250 comprises a plurality of resistors R2, R3, R4, R5 and R6, diodes D3 and D4, a capacitor C3 and a transistor Q2 for sensing a medium voltage power supply and providing a high signal when a fuse resistor 300 short-circuits. The power supply line off time detector 270 comprises a plurality of resistors R7, R8 and R9 and a transistor Q3 for providing a high signal when a power supply having the shortest falling time is applied thereto.

The PWM processor 280 comprises: an error detector 281 for comparing a varied high voltage from the high voltage variation detecting resistor R1 with a reference voltage and detecting a difference between the two voltages; a sawtooth wave generator 282 for generating a sawtooth wave locked to a horizontal blanking pulse; a comparator 283 for comparing the output of the error detector 281 with the sawtooth wave from the sawtooth wave generator 282 so as to generate a PWM pulse for compensating for the varied high voltage; a dead time detector 284 for generating a signal for cutting off the high voltage based on the outputs of the medium voltage power supply fuse short-circuit detector 250 and the power supply line off time detector 270; an inverter 285 for inverting the output of the dead time detector 284; an AND gate 286 for performing an AND operation with respect to the outputs of the comparator 283 and the inverter 285; and a PWM pulse output unit 287 for providing the PWM pulse from the AND gate 286 to the high voltage output unit 210. An anode voltage supply unit 310 provides a high voltage to the CRT 200. A medium voltage power supply unit 320 provides a medium voltage power supply to the medium voltage power supply fuse short-circuit detector 250.

The present invention will now be described in greater detail with reference to FIGS. 2 and 3. According to the brightness level of the CRT 200, the high voltage beam current changes and such beam current changes a high voltage of the high voltage output unit 210. When a horizontal drive waveform is applied to the base of the transistor Q1, the collector of the transistor Q1 provides a high voltage and the storage transformer T1 controls a high voltage regulation. A varied high voltage is induced in a secondary winding of the storage transformer T1 and then applied to a primary winding of the flyback transformer T2 in the FBT 220. At this time, the varied high voltage is detected by the high voltage variation detecting resistor R1 in the FBT 220.

The signal of the varied high voltage detected in the high voltage variation detecting resistor R1 is applied to the error detector 281. The error detector 281 compares the varied high voltage signal with a reference voltage signal and differentially amplifies the difference between the two signals. The amplified difference is applied to the comparator 283. The sawtooth wave generator 282 generates a sawtooth wave locked to a horizontal blanking pulse signal to the comparator 283. The comparator 283 determines the difference between the error detector 281 and the sawtooth wave from the sawtooth wave generator 282 to generate a PWM pulse.

A spot killer is a circuit which protects the CRT 200 when power is turned off. Even if the spot killer operates when the power is turned off, residual high voltage is maintained in a state in which deflection is terminated so that a spot phenomenon still occurs. To control the phenomenon in which the residual high voltage is maintained, the dead time detector 284 blocks the high voltage depending on the outputs of the medium voltage power supply fuse short-circuit detector 250 and the power supply line off time detector 270.

The falling time power supply detector 260 detects a power supply having the shortest falling time from power supplies used in the system. The power supply line off time detector 270 applies a high voltage to the dead time detector 284 via the transistor Q3 at the moment when the power of the system is cut off.

In an abnormal state (for example, breakdown of parts in the CRT driver 240), a medium voltage (a cathode voltage) of the: CRT 200 is grounded and the fuse resistor 300 for protecting a power supply system short-circuits. The CRT driver 240 becomes reversely driven when the medium voltage is not applied, causing strong beam current to flow across the surface of the CRT 200. At this time, if the power of the system is cut off, a large amount of electron beams are maintained and a 70–90 percent spot occurs causing the CRT 200 to malfunction. In order to prevent such phenomenon, the medium voltage power supply fuse short-circuit detector 250 generates and sends to the dead time detector 284 via the transistor Q2, a low voltage in a normal state (when the fuse resistor 300 does not short-circuit) and a high voltage in an abnormal state (when the fuse resistor 300 short-circuits).

The dead time detector 284 generates a high voltage blocking detection signal based on the output voltages from the medium voltage power supply fuse short-circuit detector 250 and/or the power supply line off time detector 270. For example, the dead time detector 284 provides a high voltage signal, namely the high voltage blocking detection signal, when a high voltage is detected from either the output of the medium voltage power supply fuse short-circuit detector 250 or the output of the power supply line off time detector 270. The inverter 285 inverts the high voltage blocking detection signal from the dead time detector 284. The AND gate 286 operates such that a PWM pulse from the comparator 283 is forwarded only when the output of the inverter 285 is high.

The PWM pulse from the AND gate 286 is applied to the gate of the current control FET in the high voltage output unit 210 via the PWM pulse output unit 287. The signal applied to the gate of the FET is varied in its pulse duty according to the change of voltage. According to the varied pulse duty, collector current in the high voltage output transistor Q1 is stored in energy in the primary winding of the storage transformer T1. The stored energy is induced in the secondary winding during a low trace scan. The induced energy is loaded on a reactance of the primary winding of the transformer T2 in the FBT 220 and a resonance waveform resonated in the capacitor C1, thereby compensating for the varied high voltage. Therefore, high voltage stabilization is achieved.

According to the present invention described above, damage on the CRT is prevented so that, primarily, costs for parts can be reduced. Secondarily, the cost of service, such as adjustment of focus and convergence required when the CRT is replaced due to damage to the CRT, can be reduced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A cathode ray tube protection system in a projection television, the system comprising:

a high voltage output unit for providing a high voltage;

a high voltage variation detector for detecting a varied high voltage from said high voltage provided by said high voltage output unit;

a cathode ray tube driver for providing a predetermined voltage to drive said cathode ray tube;

a medium voltage power supply fuse short-circuit detector for detecting a short-circuit state of a medium voltage fuse based on the operation state of said cathode ray tube driver; and a pulse width modulation processor for generating a pulse width modulation signal based on the outputs from said high voltage variation detector and said medium voltage power supply fuse short-circuit detector, wherein said pulse width modulation processor limits the output of said high voltage output unit when the medium voltage fuse short-circuits, regardless of the varied high voltage signal.

2. The system of claim 1, wherein the pulse width modulation processor comprises:

an error detector for comparing the varied high voltage from said high voltage variation detector with a reference voltage and amplifying the difference between the varied high voltage and the reference voltage to provide an output;

a sawtooth wave generator for generating a sawtooth wave locked to a horizontal blanking pulse signal;

a comparator for comparing the output of said error detector with the output of said sawtooth wave generator;

a dead time detector for providing a high voltage blocking signal when a short-circuit is detected in the medium fuse from the output of said medium voltage power supply fuse short-circuit detector; and an AND operation unit for performing an AND operation with respect to the output of said comparator and the output of said dead time detector for generating said pulse width modulation signal for compensating for the varied high voltage.

3. A cathode ray tube protection system in a projection television, the system comprising:

a high voltage output unit for providing a high voltage;

a high voltage variation detector for detecting a varied high voltage from said high voltage provided by said high voltage output unit;

a falling time power supply detector for detecting a power supply having the shortest falling time from power supplies driving said projection television;

a power supply line off time detector for providing a voltage signal indicating the on/off state of the power supply detected by said falling time power supply detector; and a pulse width modulation processor adopting a pulse modulation mode controllable for limiting the output of the high voltage output unit based on the outputs of said high voltage variation detector and said power supply line off time detector when the detected power supply is in the off state.

4. The system of claim 3, wherein the pulse width modulation processor comprises:

an error detector for comparing the varied high voltage from said high voltage variation detector with a reference voltage and amplifying the difference between the varied high voltage and the reference voltage to provide an output;

a sawtooth wave generator for generating a sawtooth wave locked to a horizontal blanking pulse signal;

a comparator for comparing the output of said error detector with the output of said sawtooth wave generator;

a dead time detector for providing a high voltage blocking signal when the output of said power supply line off time detector indicates that the detected supply voltage is in the off state; and an AND operation unit for performing an AND operation with respect to the output of said comparator and the output of said dead time detector for generating a pulse width modulation pulse for compensating for the varied high voltage.

5. A cathode ray tube protection system in a projection television, the system comprising:

a high voltage output unit for providing a high voltage;

a high voltage variation detector for detecting a varied high voltage from said high voltage provided by said high voltage output unit;

a cathode ray tube driver for providing a predetermined voltage to drive said cathode ray tube;

a medium voltage power supply fuse short-circuit detector for detecting a short-circuit state of a medium voltage fuse based on the operation state of said cathode ray tube driver;

a falling time power supply detector for detecting a power supply having the shortest falling time from power supplies driving said projection television;

a power supply line off time detector for providing a voltage signal indicating the on/off state of the power supply detected by said falling time power supply detector; and a pulse width modulation processor for receiving the varied high voltage from said high voltage variation detector, the short-circuit state from said medium voltage power supply fuse short-circuit detector, and the power on/off voltage signal from said power supply line off time detector and generating a pulse width modulation signal for controlling the output of the high voltage output unit, wherein said pulse width modulation processor limits the output of said high voltage output unit when the medium voltage fuse is in a short-circuited state or when the detected power supply is in the off state, regardless of the varied high voltage signal.

6. The system of claim 5, wherein the pulse width modulation processor comprises:

an error detector for comparing the varied high voltage from said high voltage variation detector with a reference voltage and amplifying the difference between the varied high voltage and the reference voltage to provide an output;

a sawtooth wave generator for generating a sawtooth wave locked to a horizontal blanking pulse signal;

a comparator for comparing the output of said error detector with the output of said sawtooth wave generator;

a dead time detector for providing a high voltage blocking signal when the output of said medium voltage power supply fuse short-circuit detector indicates that the medium voltage fuse is in a short-circuited state or when the output of said power supply off time detector indicates the off state of the detected supply voltage; and an AND operation unit for performing an AND operation with respect to the output of said comparator and the output of said dead time detector for generating said pulse width modulation signal for compensating for the varied high voltage.

7. A cathode ray tube protection system in a projection television, the system comprising:

a high voltage output unit which receives an input from a pulse width modulation processor and provides a high voltage output;

a high voltage variation detector which receives an input from said high voltage output unit and detects a varied high voltage of said high voltage output unit;

a cathode ray tube driver which provides a predetermined voltage to drive a cathode ray tube;

a medium voltage power supply fuse short-circuit detector which receives inputs from said cathode ray tube driver and from a medium voltage supply unit, and detects a short-circuit state of a medium voltage fuse based on the operation state of said cathode ray tube driver; and said pulse width modulation processor which receives inputs from said high voltage variation detector and from said medium voltage power supply fuse short-circuit detector and generates a pulse width modulation signal, wherein said pulse width modulation processor limits the output of the high voltage output unit when the medium voltage fuse short-circuits, regardless of the varied high voltage signal.

8. The cathode ray tube protection system according to claim 7, wherein said high voltage output unit further receives an input from a horizontal drive waveform.

9. The cathode ray tube protection system according to claim 7, wherein said cathode ray tube driver receives an input from a signal processor.

10. The system of claim 7, wherein the pulse width modulation processor comprises:

an error detector which receives an input from said high voltage variation detector and compares the varied high voltage with a reference voltage, and amplifies the difference between the varied high voltage and the reference voltage;

a sawtooth wave generator which generates a sawtooth wave locked to a horizontal blanking pulse signal;

a comparator which compares inputs from said error detector and said sawtooth wave generator;

a dead time detector which receives an input from said medium voltage power supply fuse short-circuit detector and provides a high voltage blocking signal when a short-circuit is detected in said medium fuse of said medium voltage power supply fuse short-circuit detector; and an AND operation unit which receives inputs from said comparator and said dead time detector and performs an AND operation for generating said pulse width modulation signal to compensate for the varied high voltage.

11. A cathode ray tube protection system in a projection television, the system comprising:

a high voltage output unit which receives an input from a pulse width modulation processor and provides a high voltage output;

a high voltage variation detector which receives an input from said high voltage output unit and detects a varied high voltage of said high voltage output unit;

a falling time power supply detector which detects a power supply having the shortest falling time from power supplies driving the projection television;

a power supply line off time detector which receives an input from said falling time power supply detector and provides a voltage signal to a dead time detector, indicating the on/off state of said power supply detected by said falling time power supply detector; and a pulse width modulation processor which receives inputs from said high voltage variation detector and from said power supply line off time detector and generates a pulse width modulation signal, wherein said pulse width modulation processor limits the output of said high voltage output unit when the detected power supply is in the off state.

12. The cathode ray tube protection system according to claim 11, wherein said high voltage output unit further receives an input from a horizontal drive waveform.

13. The system of claim 11, wherein the pulse width modulation processor comprises:

an error detector which receives an input from the high voltage variation detector and compares the varied high voltage with a reference voltage, and amplifies the difference between the varied high voltage and the reference voltage;

a sawtooth wave generator which generates a sawtooth wave locked to a horizontal blanking pulse signal;

a comparator which compares inputs from said error detector and said sawtooth wave generator;

a dead time detector which receives an input from said power supply line off time detector and provides a high voltage blocking signal when the output of said power supply line off time detector indicates that the detected supply voltage is in the off state; and an AND operation unit which receives inputs from said comparator and said dead time detector and performs an AND operation for generating said pulse width modulation signal to compensate for the varied high voltage.

14. A cathode ray tube protection system in a projection television, the system comprising:

a high voltage output unit which receives an input from a pulse width modulation processor and provides a high voltage output;

a high voltage variation detector which receives an input from said high voltage output unit and detects a varied high voltage of said high voltage output unit;

a cathode ray tube driver which provides a predetermined voltage to drive a cathode ray tube;

a medium voltage power supply fuse short-circuit detector which receives inputs from said cathode ray tube driver and from a medium voltage supply unit, and detects a short-circuit state of a medium voltage fuse based on the operation state of said cathode ray tube driver;

a falling time power supply detector which detects a power supply having the shortest falling time from power supplies driving the projection television;

a power supply line off time detector which receives an input from said falling time power supply detector and provides a voltage signal to a dead time detector, indicating the on/off state of said power supply detected by said falling time power supply detector; and a pulse width modulation processor which receives inputs from said high voltage variation detector, from said medium voltage power supply fuse short-circuit detector, and from said power supply line off time detector and generates a pulse width modulation signal, wherein said pulse width modulation processor limits the output of said high voltage output unit when the medium voltage fuse is in a short-circuited state or when the detected power supply is in the off state, regardless of the varied high voltage signal.

15. The cathode ray tube protection system according to claim 14, wherein said high voltage output unit further receives an input from a horizontal drive waveform.

16. The cathode ray tube protection system according to claim 14, wherein said cathode ray tube driver receives an input from a signal processor.

17. The system of claim 14, wherein the pulse width modulation processor comprises:

an error detector which receives an input from the high voltage variation detector and compares the varied high voltage with a reference voltage, and amplifies the difference between the varied high voltage and the reference voltage;

a sawtooth wave generator which generates a sawtooth wave locked to a horizontal blanking pulse signal;

a comparator which compares inputs from said error detector and said sawtooth wave generator;

a dead time detector which receives inputs from said power supply line off time detector and from said medium voltage power supply fuse short-circuit detector, and provides a high voltage blocking signal when the output of said power supply line off time detector indicates that the detected supply voltage is in the off state or when the output of said medium voltage power supply fuse short-circuit detector indicates that the medium voltage fuse is in a short-circuited state; and an AND operation unit which receives inputs from said comparator and said dead time detector and performs an AND operation for generating said pulse width modulation signal to compensate for the varied high voltage.

18. A method of protecting a cathode ray tube in a projection television, comprising the steps of:

(a) determining an operating state for a medium voltage fuse of a medium voltage power supply fuse short-circuit detector; and (b) when said medium voltage fuse is in a short-circuit state, limiting the output of a high voltage output unit.

19. A method of protecting a cathode ray tube in a projection television, comprising the steps of:

(a) determining a shortest falling time for power supplies driving the projection television;

(b) determining the on/off state of the detected power supply having the shortest falling time; and (c) when the detected power supply is in the off state, limiting the output of a high voltage output unit.

20. A method of protecting a cathode ray tube in a projection television, comprising the steps of:

(a) determining an operating state for a medium voltage fuse of a medium voltage power supply fuse short-circuit detector;

(b) determining a shortest falling time for power supplies driving the projection television;

(c) determining the on/off state of the detected power supply having the shortest falling time; and (d) when said medium voltage fuse is in a short-circuit state or when the detected power supply is in the off state, limiting the output of a high voltage output unit.

* * * * *